(No Model.)
E. CROSSLEY & R. COCHRANE.
PILE WIRE FOR LOOMS.
No. 330,821. Patented Nov. 17, 1885.
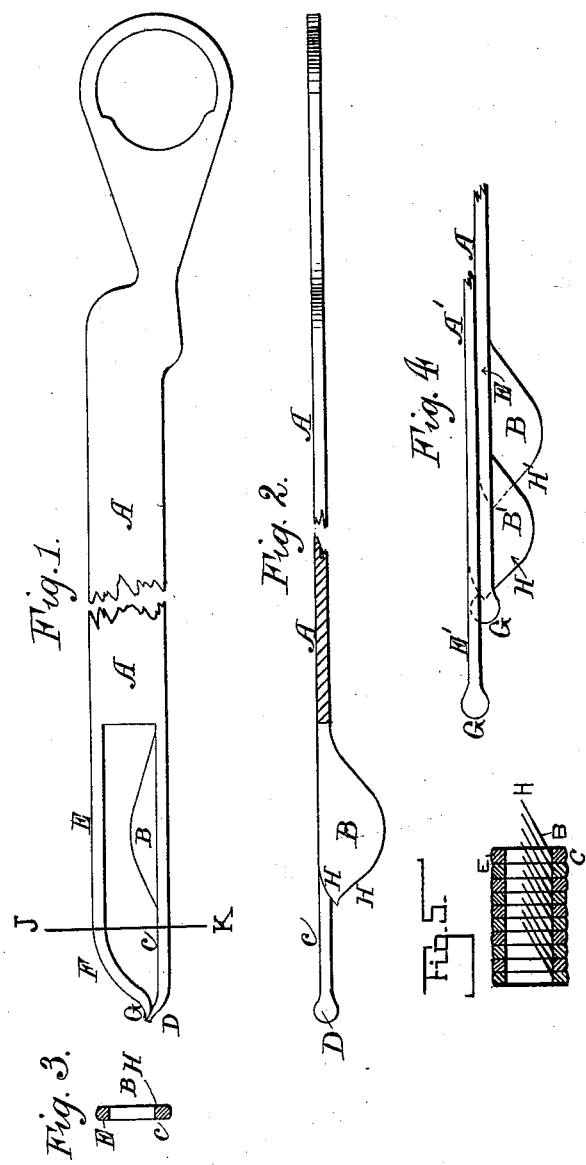
Witnesses:
Percy White
G. L. DeMotte
Inventors
Edward Crossley
Richard Cochrane
by John J. Halsted & Son
their Attys

UNITED STATES PATENT OFFICE.

EDWARD CROSSLEY AND RICHARD COCHRANE, OF HALIFAX, COUNTY OF YORK, ENGLAND.

PILE-WIRE FOR LOOMS.

SPECIFICATION forming part of Letters Patent No. 330,821, dated November 17, 1885.

Application filed September 6, 1884. Serial No. 142,415. (No model.) Patented in England May 2, 1883, No. 2,225.

*To all whom it may concern:*

Be it known that we, EDWARD CROSSLEY and RICHARD COCHRANE, subjects of the Queen of Great Britain, residing at Halifax, in the county of York, England, have invented a new and useful Improvement in Pile-Wires for Looms, (for which we have obtained a patent in Great Britain, No. 2,225, dated the 2d of May, 1883,) of which the following is a specification.

Our invention and improvement consist in a deep pile-wire, which has a knife or cutting-edge at its side, and strips constituting a guide to hold the warp fast until it has been cut by the knife or cutting edge or blade, which strips are so constructed as to allow the insertion and withdrawal of the wires, or of their adjacent wires in weaving, without injury to their cutting-edges.

Wires constructed according to our invention are inserted and withdrawn either by hand or by an ordinary wire-motion. We construct the wire, preferably, of flat steel or other metal, having near its end an inclined knife or cutting blade or edge, which is either cut out of the material composing the wire, or brazed or otherwise attached to a strip or bar left at one extremity of the wire. The bar or strip holding the knife-blade or cutting-edge is by preference near the bottom part of the wire, and the said strip or bar carrying the blade or cutting-edge is slightly bent up at the end. The upper side of the extremity of the wire also terminates in a narrow strip or bar which projects beyond the blade, and may be bent downward, so as to rest on the bent-up extremity of the lower strip or bar. In this case either one or both of the strips or bars must be sufficiently pliable to spring open when the strips of the wire which is being drawn out come in contact with the blades of the adjacent wires which are in the cloth, and which project into the space in the wire which is inclosed by the upper and lower strips. The strips of the wire which is being drawn out then pass one above and one below the blades of the wires in the cloth, which project into the space inclosed by the strips, without injury to the cutting-edges of the blades, and after passing the blades the strips spring back into their original position. The strips or bars at the end of the wire form a guide to hold the pile-warp fast until it has been cut by the blade, the upper one of these strips serving to keep the loops properly distended, and to insure the uniform cutting of the pile of two different lengths or depths, because the cutting-edge, being at one side, does not cut the loops at their bight or center. The angle or inclination given to the knives causes them to overlap one another when inserted in the cloth, and the shape and pliability of the bars or strips allow the wires to be inserted and drawn out without injury to the cutting-edges of the same, and enables us to use any required number of our improved wires without the addition of any ordinary pile-wires.

We sometimes employ wires having the top and bottom strips or bars not touching one another, but with a sufficient space between them to allow the blades to pass without the necessity of making either of them act as springs; but in order to enable our improvements to be fully understood we will proceed to more particularly describe the same by reference to the accompanying drawings, in which—

Figure 1 represents a side elevation of our improved wire adapted for cutting piles of different lengths, the wire being shown as broken away at its middle for convenience of illustration. Fig. 2 is a plan thereof with the top part cut away to show the knife or blade. Fig. 3 is a front sectional view of the end of a wire cut at the line J K of Fig. 1. Fig. 4 is a top view showing the action of the blades when working with two or more wires, and Fig. 5 is a sectional view of the ends of a number of wires cut at the line J K of Fig. 1, as they stand in the cloth, showing the way in which the blades of the various wires pass through the spaces surrounded by the strips.

Similar letters of reference in all the figures represent similar parts.

A represents one of a set of flat deep wires, made of steel or other metal, having an inclined knife or cutting blade or edge, B, and which blade is either cut out of the steel or other metal of the wire, or it may be brazed or otherwise attached to a strip or bar, C, which is slightly bent up at the end at D. The upper side of the extremity of the wire A is made with a narrow strip or bar, E, having a curved extremity, F, made with a bent-up end, G, which rests or nearly rests on the top end, D. Both the ends D and G of the strips C and E are made slightly larger than the thickness of the strips or bars. This enlargement is shown at D in Fig. 2, and these enlarged ends are made smooth on the side where they touch or nearly touch one another, so that the strips of a wire being withdrawn from the cloth will easily permit the blades of the adjacent wires in the cloth to pass between them. The strips or bars C and E are made pliable, so as to spring open when, as they are being withdrawn from the cloth, they come in contact with the blades B of the wires remaining in the cloth, which project into the space in the wire inclosed by the strips C and E.

At Fig. 4 the wire A is being withdrawn from the cloth, and the similar wire, A', is remaining in the cloth. The blade B' of the wire A' on being inserted in the cloth, owing to its angle or inclination, passes over the blade B of the wire A into the space inclosed by the strips E and C. When the wire A is withdrawn from the cloth, the ends G and D of the strips or bars E and C come in contact with the blade B' of the wire A' and are forced apart, E passing, as shown in Fig. 4, above and C below the blade, until they resume their original position on coming to the end of the blade. In some cases the blades of several wires project between the strips E and C, which are then forced sufficiently apart to pass the whole of the blades projecting between the strips, and thus not to injure their cutting-edges H. The bars C E form a guide and hold the pile-warp fast until it has been cut by the blade, and insure the uniform cutting of the pile of two different lengths or depths. The angle or inclination given to the knives B causes them to overlap one another, as shown in Fig. 5, and the shape and pliability of the bars or strips allow the wires to be inserted and drawn out without injury to the cutting-edges H.

We can use any number of our improved wires without the addition of any ordinary pile-wires.

Having thus described our invention and the best means we are acquainted with for carrying the same into effect, we would have it understood that what we claim is—

A flat pile-wire having an inclined side cutting-blade, and strips, formed substantially as described, adapted to hold the warp-yarns tight while being cut, and to receive between them the blades of adjacent wires, said strips constituting a guide, and being free at their ends to permit of their withdrawal past the said blades, substantially as described.

EDWARD CROSSLEY.
R. COCHRANE.

Witnesses:
H. MORMAN MELLOR.
HY. BENTTELL.